(12) United States Patent
Chester

(10) Patent No.: US 6,971,933 B1
(45) Date of Patent: Dec. 6, 2005

(54) REAR LIGHT FOR A MOTOR BOAT PROPELLER TO FACILITATE SAFE TRAILER TRANSPORT OF THE MOTOR BOAT

(76) Inventor: Dan Chester, 73 Cliff House Acres Cir., Camdenton, MO (US) 65020

( * ) Notice: Subject to any disclaimer, the term of this patent is extended or adjusted under 35 U.S.C. 154(b) by 0 days.

(21) Appl. No.: 11/062,248

(22) Filed: Feb. 18, 2005

Related U.S. Application Data

(60) Provisional application No. 60/546,253, filed on Feb. 20, 2004.

(51) Int. Cl.[7] .............................................. B63H 19/00
(52) U.S. Cl. ..................................... 440/113; 362/477
(58) Field of Search ....................... 440/113; 362/477; 359/522

(56) References Cited

U.S. PATENT DOCUMENTS

| | | | | |
|---|---|---|---|---|
| 3,080,581 A | * | 3/1963 | Smihal | 114/343 |
| 4,045,122 A | * | 8/1977 | Burdick | 359/549 |
| 5,980,073 A | * | 11/1999 | Whipple | 362/485 |
| 6,217,200 B1 | * | 4/2001 | Huffman | 362/477 |
| 6,874,920 B2 | * | 4/2005 | Huffman et al. | 362/477 |

* cited by examiner

Primary Examiner—Jesus D. Sotelo

(57) ABSTRACT

A tail light to be installed onto the end of a boat motor propeller, to increase visibility of the propeller when the boat is being hauled on a trailer. The tail light includes a light fixture secured to a mounting plate. The mounting plate is configured to fit onto the propeller hub. A strap releasably secures the tail light in position on the hub. The tail light is wired to wiring of the trailer to illuminate the location of the end of the propeller when the boat is secured on the trailer.

10 Claims, 3 Drawing Sheets

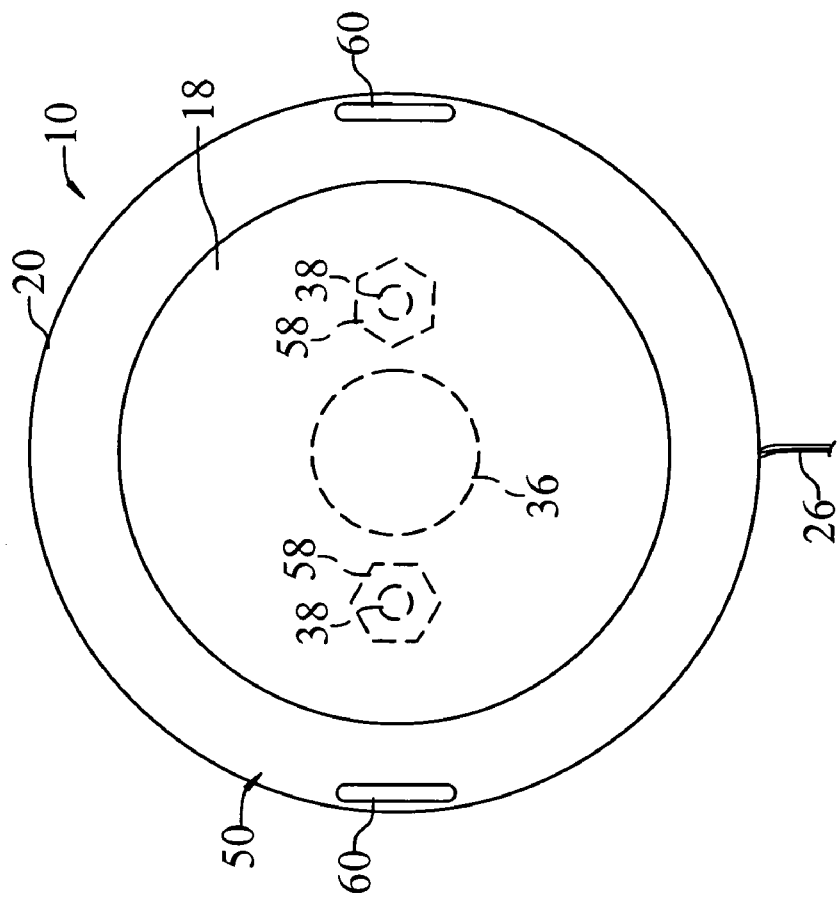
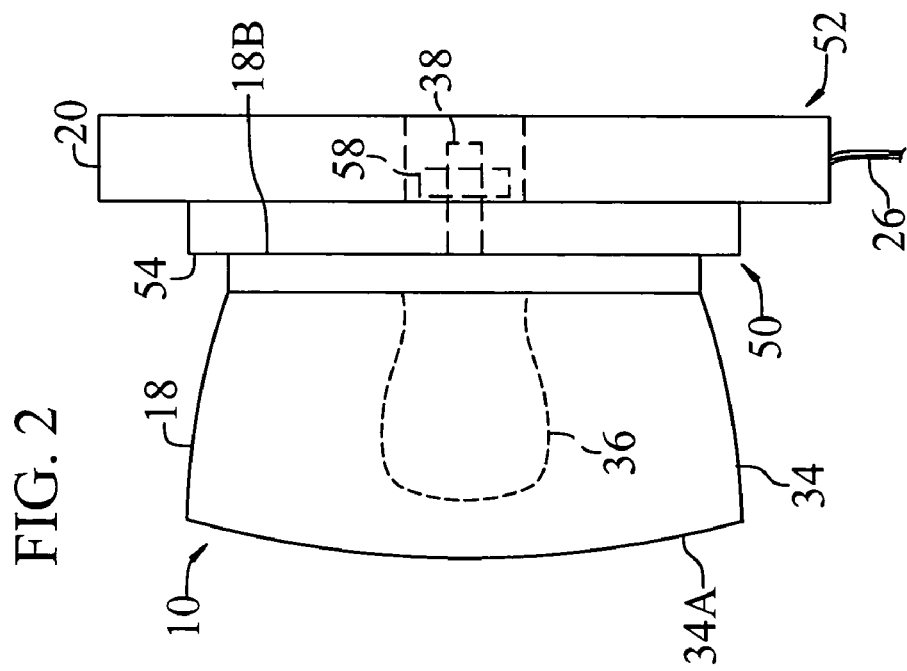

REAR LIGHT FOR A MOTOR BOAT PROPELLER TO FACILITATE SAFE TRAILER TRANSPORT OF THE MOTOR BOAT

CROSS-REFERENCES TO RELATED APPLICATIONS

This application claims priority to U.S. Provisional Patent Application Ser. No. 60/546,253 filed Feb. 20, 2004.

INCORPORATION-BY-REFERENCE OF MATERIAL SUBMITTED ON A COMPACT DISC

Not applicable.

STATEMENT REGARDING FEDERALLY SPONSORED RESEARCH OR DEVELOPMENT

Not applicable.

BACKGROUND OF THE INVENTION

1. Field of Invention

The present invention relates generally to a safety device for motor boats.

More particularly, the invention relates to a portable light for installation onto the hub end of a boat motor propeller, and for connection to the wiring of a trailer as a tail light and/or brake light, to facilitate safe transport of the motor boat on the trailer.

2. Description of Prior Art

When hauling a motor boat on a trailer, the motor is typically braced into a position with the end of the propeller angled rearwardly from the back of the boat. As a result, the end of the propeller is the rearward most part of the boat, and may hang out over the end of the trailer. This practice results in potential danger to drivers following the trailer, and potential liability of the driver pulling the trailer and boat.

There is a need for a device that addresses the above-identified drawbacks and disadvantages associated with hauling motor boats, and reduces the dangers associated therewith. In particular, there is a need for a device that enables lighting the end of the propeller, or otherwise making it more easily identifiable by drivers following the trailer, that is convenient and simple to use, and that can be quickly and easily removed when not in use so as to not interfere with normal use of the boat.

The inventor of the present invention has investigated, but is not aware of any currently available, convenient device for lighting or providing ease of identification of the end of the propeller of a motor boat when being hauled on a trailer.

SUMMARY OF THE INVENTION

The general aim of the present invention is to provide a new and unique device for illuminating the end of a propeller, for use when the boat is on a trailer, to make the end of the propeller readily identifiable from behind the trailer.

Another important objective of the invention is to provide a new and unique illuminating device that is quickly and easily installed onto and removed from the end of the propeller, and that is configured for convenient storage when not installed onto the end of the propeller.

These and other objectives and advantages of the invention will become more apparent from the following detailed description when taken in conjunction with the accompanying drawings.

BRIEF DESCRIPTION OF THE DRAWINGS

FIG. 2 is a side view of certain parts of the light shown in FIG. 1.

FIG. 3 is a front view of the parts shown in FIG. 2.

Figure 1:
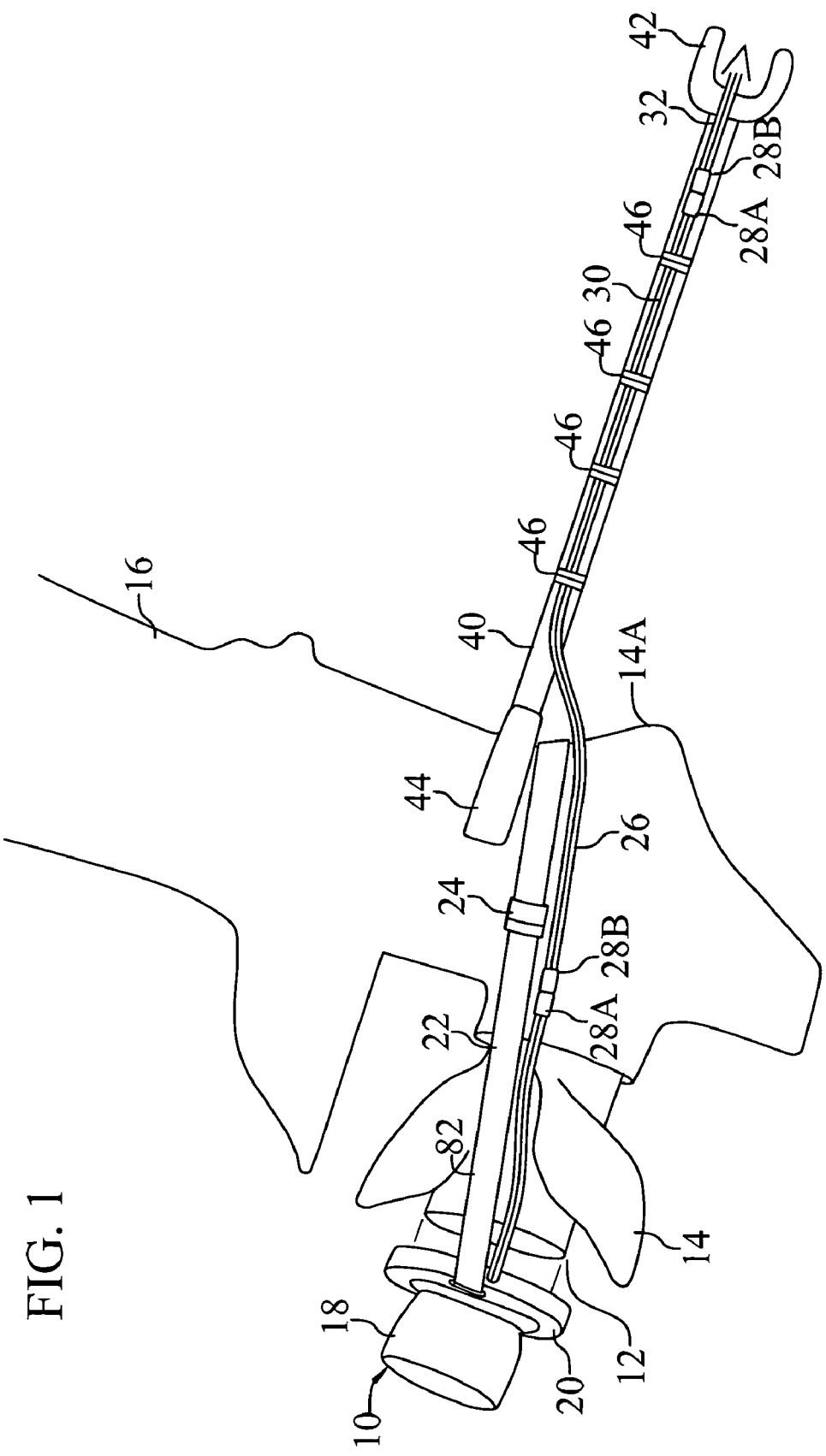
FIG. 1 is a side view of a tail light assembly in accordance with the invention, the tail light assembly being shown as installed onto the end of a boat motor propeller.

Reference numerals in the drawings correspond to the following:

10—tail light assembly
12—free end of propeller hub
14—propeller
14A—propeller housing
16—boat motor
18—light fixture
18B—back of light fixture
20—mounting plate
22—mounting strap
24—buckle
26—electrical wires
28A—quick connect part
28B—quick connect part
32—wire from trailer
34—housing
34A—front of housing
36—light bulb
38—threaded mounting studs
40—motor support brace
42—fork end
44—fork end
46—wiring tie-down tape
50—front side of mounting plate 20
52—back side of mounting plate 20
54—mounting surface
56—clearance holes
58—threaded nuts
60—slots
62—counterbore
66—outer ring
68—inner ring
70—groove
72—center through bore
80—clearance hole
82—strap While the invention is susceptible of various modifications and alternative constructions, a certain illustrated embodiment has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF THE INVENTION

The present invention is shown in the drawings as embodied in tail light assembly 10 (FIG. 1) installed onto the free hub end 12 of a propeller 14 of a boat motor 16. The tail light assembly, motor and propeller shown in FIG. 1 is a right side view. The left side view of the tail light assembly, boat and propeller is substantially a mirror image of the right side view shown, except as noted below.

The tail light assembly 10 includes a light fixture 18 secured to a mounting plate 20 that fits over the hub end 12 of the propeller 14. A mounting strap 22 is secured to opposite sides of the mounting plate and circles around the back of the propeller housing 14A to secure the light fixture and mounting plate in position on the propeller hub.

The strap shown is nylon strap 82, split on the right side (see FIG. 1), and a two-part snap-together plastic buckle 24 is connected to the right-side split ends of the strap. The buckle is of the type that enables repositioning of each part by sliding along the free end portions of strap. Alternately, for example, the strap may be elastic to assist in providing a snug fit on the end of the propeller hub 12.

The tail light assembly 10 is secured in position on the end of the propeller hub 12 by snapping the buckle 24 parts together, and if necessary, drawing the free ends of the strap 82 further through the buckle parts to cinch-up the strap around the propeller housing. The two parts of the buckle are snapped apart for quick removal of the tail light assembly from the propeller.

The light fixture 18 shown is a conventional automotive or trailer-type self-contained fixture with a plastic housing 34, a 12-volt tail light bulb 36 located in the housing, and a pair of threaded studs 38 extending rearwardly from the back side of the housing. The front 34A of the housing is colored (typically red) and transparent, translucent or otherwise to permit light from the light bulb to pass therethrough, and the back of the housing is secured at the back 18B of the fixture. The back 18B of the fixture is provided with rearwardly extending threaded mounting studs 38 or other provisions for securing the back of the fixture to the mounting plate 29. Alternate self-contained light fixtures can be used in the invention.

Electrical wires 26 are connected to the internal light bulb 36 in the light fixture 18, and extend from the mounting plate to be connected to the electrical wiring of the trailer to power the tail light. In the embodiment shown, the free ends of the electrical wires 26 are provided with quick-connect electrical connectors 28A for connection to complimentary connectors 28B provided at the ends of wires 32 from the trailer. If required, a wire coupling length 30, with complimentary quick-connects (28A, 28B) at its two ends, may be provided between the wires 26 from the taillight and the wires 32 from the trailer.

In common practice, the motor housing 14A is clipped into the position shown in FIG. 1 with a motor support brace 40. A fork 42 at one end of the brace engages the frame of the trailer and a fork 44 at the other end engages the back of the propeller housing and supports the motor in the position shown. In this instance, the electrical wiring is preferably strapped, taped or otherwise secured to the brace such as indicated at 46. This arrangement enables the tail light assembly to be installed, removed and stored with the support brace.

Figure 5:
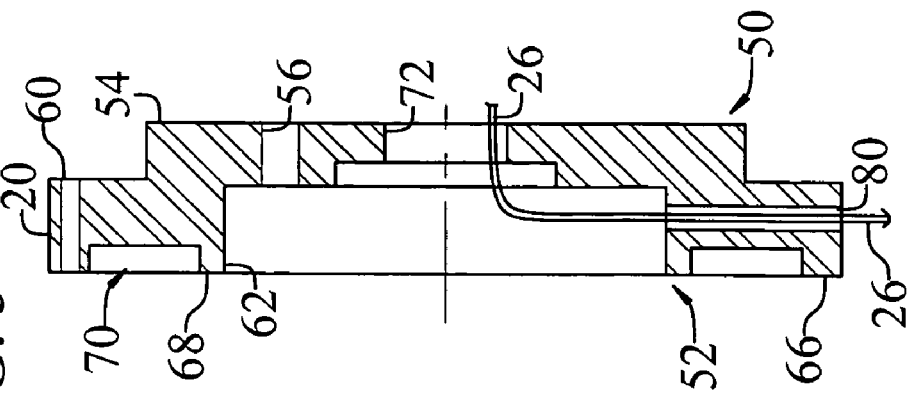
FIG. 5 is a side cross-sectional view of the mounting plate.
Figure 4:
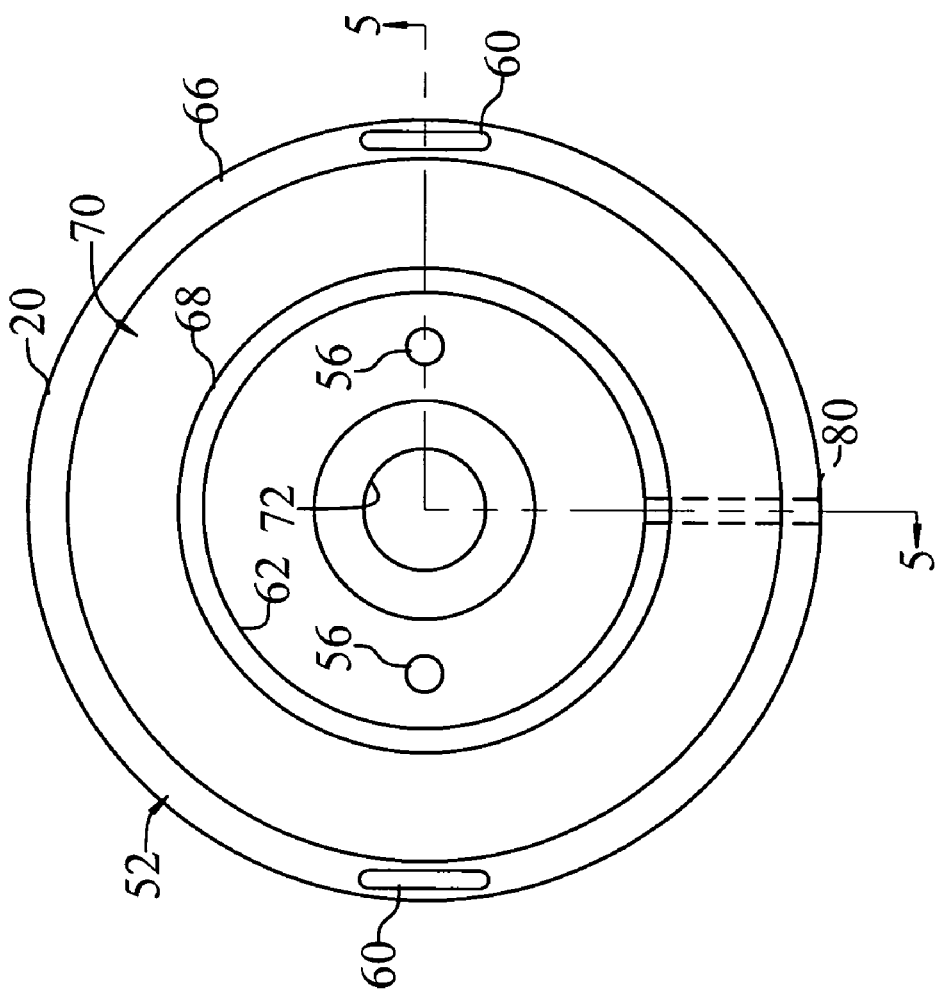
FIG. 4 is a back view of the mounting plate shown in FIGS. 2–3.

Referring to FIG. 5, the mounting plate 20 includes a front side 50 and a back side 52. The front side is provided with a center light fixture mounting surface 54, and a pair of clearance holes 56 extending through the thickness of the plate to receive the threaded mounting studs 38 of the light fixture. Located on opposite sides of the mounting plate are a pair of slots 60 through which the strap 82 is secured.

The back side 52 of the mounting plate 20 is formed with a center counterbore 62 into which the threaded mounting studs 38 extend, and within which threaded nuts 58 tightened onto the threaded studs to secure the fixture 18 to the plate 20 are entirely enclosed. The depth of this counterbore is sufficient such that the back surface of the mounting plate is generally aligned with or rearwardly of the back sides of the threaded nuts and threaded studs.

With the light fixture 18 secured to the mounting plate 20, the electrical wires 26 extend from the back of the light fixture through the center bore 72 and through a radially extending hole 80 established through the thickness of the mounting plate forwardly of the groove 70.

The back side 52 of the mounting plate 20 is further provided with an outer ring 66, an inner ring 68, and a forwardly cut groove 70 located radially between the outer and inner rings. The groove is sized to receive the outer hub 12 at the end of the propeller 14. The inner and outer rings permit some sliding of the tail light on the hub, but prevent the tail light from sliding off the end of the hub so long as it is at least reasonably snug in position. In other words, the groove is sized to receive and surround the hub radially outwardly and inwardly in relation to the center rotational axis the hub and/or propeller.

In one preferred embodiment, the groove 70 is formed with an outer diameter of between approximately two and one-half to two and three-fourth inches, a groove width of between approximately three-fourths to seven-eighths inch, and a groove depth of approximately one-eighth inch. This preferred embodiment will enable use of the same mounting plate configuration on approximately 80% to 95% of the size propellers of the typical individual or family boat owner.

In normal use, the tail light assembly 10 will be wired to the wiring harness of the trailer as a normal tail light, with signal indication for when the driver of the vehicle applies the brakes. Of course the tail light may be alternately wired, such as a continuously on running light when the headlights are on.

The following sample installation instructions are provided for further illustrative purposes:

1. Remove light assembly from package.
2. The side opposite the taillight is the mounting plate. The mounting surface of the light assembly has a ⅛" deep groove, which is to be placed over the hub of your boat propeller.
3. Next, while holding the light assembly in place on the end of the propeller hub, use the strap and buckle connection furnished and wrap around lower-unit of motor from both sides and above motor support bracket, then buckle in place. Pull tag end of strap to snug fit around lower unit of motor. Once you have the buckle located in the position of your choice, cut any extra nylon strap off and lightly heat tag end of strap, so strap will not unravel.
4. Tools needed for wiring:
   A. (2)-Double Wire harnesses with pigtails.
   B. Electrical tester.
   C. Wire cutters.
   D. Soldering gun and electrical solder (You can use quick connectors to make the final connections at trailer and wiring harness. You will need to wrap quick connectors with electrical tape.)

E. Duct tape: Use small amounts for holding wires, while assembly of wiring.

F. Electrical tape (black in color).

Can be wired to trailer harness as a tail light and or brake light.

IF WIRED AS RUNNING LIGHT, HEADLIGHTS MUST BE ON WHEN TRAILER IS IN TOW TO ILLUMINATE!

NOTE: Wire color on your wire harnesses may not match the color of your trailer. So, you will need to pay close attention to the colors as you connect them to each other. Making curtain that wires from trailer to each harness are connected properly.

The following are sample instructions including initial wiring of the tail light:

1. Place engine support bracket to the engine and the trailer, as if you were to tow your boat. If you do not have a support bracket, you will have to devise something to hold your wiring from dragging or falling to the ground.

2. As illustrated: Place the mounting plate over hub of prop.

3. While holding light assembly in place on prop, take the mounting strap and place around the lower-unit of engine as shown in the diagram and connect at buckle.

4. Once again, while holding light assembly in place on prop, pull on tag end of strap in order to create a snug fit from mounting bracket to prop hub.

5. Once item #3 is in place, route wires coming from mounting bracket between two of the blades on your prop. Use duct tape to hold wires, coming from the mounting bracket to the prop.

6. Next, solder connector "A", to wires coming from light assembly, using duct tape, tape end of wire behind connector "A" to the lower-unit, leaving this connector accessible.

7. Next, take opposite end of connector "B" and plug into the accessible connector "A" that was duct taped to the lower-unit.

8. Tape connector "B" wire to the lower-unit leaving some slack in wires.

9. Next duct tape or use electrical tape to secure wire coming from connection "B", along side of support bracket. Tape at 4" intervals, until you reach connector "C", leaving approximately 4" of slack before this connector.

10. Next, plug connector "C" into connector "D". DO NOT TAPE the wires coming from connector "D" to the trailer.

11. You may have extra wire coming from connector "D" to the trailer. Leave enough wire to run along the trailer frame and to the trailer wires you will be connecting to.

12 Next, lay the wire coming from connector "D" on top of the trailer frame. At this point you need to us a 12-volt electrical light tester, to determine which wires on trailer are positive and negative. Normally the "red wire" is "positive" and the "white wire" is "negative".

13. Using an electrical tester, locate your ground wire, which is normally white in color and "Hot" or positive wire, which is normally red in color on your trailer.

14. Once, you have determined which wires to connect from connector "D" to trailer wires. Splice the appropriate wires; do not cut wires into on trailer, wrap exposed end of connector "D" wire around appropriate wire stripped at trailer and solder in place. Or use quick connectors, using the connectors you DO NOT need to strip wires at trailer. Once connected, wrap with electrical tape.

15. Once, you have made the final connections at trailer. Lay wires coming from connector "D" to trailer, along trailer frame and use plastic wire ties to attach excess wire to trailer, so not to hang down below the frame, but leave some slack in wire.

16. Once, connected the light assembly should come on with your headlight on tow vehicle.

17. Now, go back and remove all tape from items 5–8 of instructions.

The purpose of the light assembly is an aid the drivers behind you to be more aware of what is in front of them. This device will reduce the likelihood of potential rear end collisions and tailgating. Boat motors do extent out from the boat and trailer and can be difficult to judge that distance.

The foregoing instructions are based on the boat owner doing at least some of the wiring to connect the trailer light hereof. This will enable the boat owner it install as a tail light, a brake light, or a running light. However, alternate installation instructions will be readily devised by those skilled in the arts.

From the foregoing, it will be apparent that the tail light assembly in accordance with the invention, when wired for illumination, will substantially increase visibility of the location of the end of the propeller of a boat when secured to a trailer. Thus, the tail light assembly will reduce the likelihood of an accident that might otherwise result from the drive of a vehicle behind the trailer not being able to see the end of the propeller.

I claim:

1. A tail light for releasably positioning on the propeller hub of a boat motor while the boat is carried on a trailer, the tail light comprising:
    a) a light fixture with:
        i) a housing having a front and a back, the front of the housing permitting light to pass therethrough, and
        ii) a low voltage light secured in the housing and positioned for illuminating through the front of the housing;
    b) a mounting plate having
        i) a front side, a back side, and wall structure therebetween, and
        ii) a hole formation extending from said front side through said wall structure,
        iii) the back of the housing being secured to the front side of the mounting plate,
        iv) the back side of the mounting plate having a forwardly cut annular groove for loosely fitting over the propeller hub;
    c) electrical wire connected to the light bulb, the wire extending out from the back of the housing and through said hole formation to outside the wall structure of the mounting plate; and
    d) a snugable strap connected between opposite sides of the mounting plate, the strap being configured for removable positioning around the boat motor with the propeller hub received in said groove of the mounting plate.

2. The tail light as defined in claim 1 in which the back side of the mounting plate further includes outer and inner rearwardly extending concentric rings, and said groove concentrically established between said rings.

3. The tail light as defined in claim 1 in which said strap is made at least in part with elastic material.

4. The tail light as defined in claim 1 in which said strap includes a quick-release buckle with complimentary buckle parts that are slidably positionable on the strap.

5. The tail light as defined in claim 1 further comprising a wiring coupling extending from said electrical wire for connecting to the wiring harness of the trailer, and quick-connects releasably connecting the electrical wire and the wiring coupling together.

6. The tail light as defined in claim 1 further comprising means for securing the housing to the mounting plate, said securing means being located entirely within said hole formation in the mounting plate.

7. A tail light for releasably positioning on the propeller hub of a boat motor while the boat is carried on a trailer, the tail light comprising:
   a) a light fixture with:
      i) a plastic housing having a front and a back, the front of the housing permitting light to pass therethrough,
      ii) a low voltage light secured in the housing and positioned for illuminating through the front of the housing, and
      iii) a pair of threaded mounting studs extending rearwardly from the back of the housing;
   b) a mounting plate having
      i) a front side, a back side, and an annular wall structure therebetween,
      ii) a center bore extending from said front side through to said back side,
      iii) a cross-hole extending from said center bore through said wall structure,
      iv) the back of the housing positioned to the front side of the mounting plate with said studs located within said center bore,
      v) said back side having a back surface that is characterized as being the rearwardly most surface of the housing,
      vi) said back side further having an outer ring and an inner ring established at said back surface, and having a forwardly cut groove established between said rings for loosely fitting over the propeller hub;
   c) a pair of threaded nuts secured onto said threaded studs for securing the housing to the front side of the mounting plate, the nuts being located within said center bore;
   d) electrical wire connected to the light bulb, the wire extending out from the back of the housing through said center bore and said cross-hole to outside the wall structure of the mounting plate; and
   e) a snugable strap connected between opposite sides of the mounting plate, the strap being configured for removable positioning around the boat motor with the propeller hub received in said groove of the mounting plate.

8. The tail light as defined in claim 7 in which said strap is made at least in part with elastic material.

9. The tail light as defined in claim 7 in which said strap includes a quick-release buckle with complimentary buckle parts that are slidably positionable on the strap.

10. The tail light as defined in claim 7 further comprising a wiring coupling extending from said electrical wire for connecting to the wiring harness of the trailer, and quick-connects releasably connecting the electrical wire and the wiring coupling together.

* * * * *